US009315686B2

(12) United States Patent
Ohishi

(10) Patent No.: US 9,315,686 B2
(45) Date of Patent: Apr. 19, 2016

(54) WATER-BASED INK FOR INK-JET RECORDING, WATER-BASED INK SET FOR INK-JET RECORDING, INK CARTRIDGE, AND INK-JET RECORDING METHOD

(71) Applicant: Ayako Ohishi, Nagoya (JP)

(72) Inventor: Ayako Ohishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 119 days.

(21) Appl. No.: 14/227,242

(22) Filed: Mar. 27, 2014

(65) Prior Publication Data

US 2014/0292901 A1 Oct. 2, 2014

(30) Foreign Application Priority Data

Mar. 27, 2013 (JP) ................................ 2013-067553

(51) Int. Cl.

*B41J 2/01* (2006.01)
*C09D 11/40* (2014.01)
*C09D 11/38* (2014.01)
*B41J 2/175* (2006.01)
*B41J 2/21* (2006.01)
*C09D 11/322* (2014.01)

(52) U.S. Cl.

CPC . *C09D 11/40* (2013.01); *B41J 2/01* (2013.01); *B41J 2/17503* (2013.01); *B41J 2/2107* (2013.01); *C09D 11/322* (2013.01); *C09D 11/38* (2013.01)

(58) Field of Classification Search

CPC .............. B41J 2/01; B41J 2/21; B41J 2/2107; B41J 2/17503; C09D 11/30; C09D 11/322; C09D 11/38; C09D 11/40
USPC ................ 347/20, 86, 95–100; 523/160, 161; 106/31.13, 31.6
See application file for complete search history.

(56) References Cited

U.S. PATENT DOCUMENTS

| | | | |
|---|---|---|---|
| 5,609,671 | A | 3/1997 | Nagasawa |
| 5,837,045 | A | 11/1998 | Johnson et al. |
| 6,743,284 | B2 | 6/2004 | Norimatsu et al. |
| 7,163,577 | B2 | 1/2007 | Tyrell |
| 7,922,805 | B2 | 4/2011 | Kowalski |
| 8,016,404 | B2 | 9/2011 | Kato |
| 2002/0043179 | A1 | 4/2002 | Norimatsu et al. |
| 2003/0073759 | A1 | 4/2003 | Koga et al. |
| 2005/0190244 | A1 | 9/2005 | Tyrell |
| 2006/0201380 | A1 | 9/2006 | Kowalski et al. |

(Continued)

FOREIGN PATENT DOCUMENTS

| | | | |
|---|---|---|---|
| JP | 08-003498 | A | 1/1996 |
| JP | 11-124524 | A | 5/1999 |
| JP | 2000-513396 | A | 10/2000 |
| JP | 2002-053784 | A | 2/2002 |
| JP | 2002-294110 | A | 10/2002 |
| JP | 2003-313461 | A | 11/2003 |
| JP | 2005-248178 | A | 9/2005 |
| JP | 3932820 | B2 | 6/2007 |
| JP | 2008-524400 | A | 7/2008 |
| JP | 2008-246821 | A | 10/2008 |
| JP | 4158323 | B2 | 10/2008 |
| JP | 2009-515007 | A | 4/2009 |
| JP | 2011-157417 | A | 8/2011 |
| WO | 9748769 | A1 | 12/1997 |
| WO | 2006066132 | A2 | 6/2006 |

OTHER PUBLICATIONS

Brother; Owner's Manual MFC 7150C; pp. 30-34.*

*Primary Examiner* — Matthew Luu
*Assistant Examiner* — Rut Patel
(74) *Attorney, Agent, or Firm* — Banner & Witcoff, Ltd.

(57) ABSTRACT

A water-based ink for ink-jet recording includes a pigment; water; an acetylene glycol-based surfactant contained by 0.1% by weight to 0.3% by weight in the water-based ink; tripropylene glycol methyl ether contained by 2.5% by weight to 4.5% by weight in the water-based ink; and tripropylene glycol n-butyl ether contained by 0.5% by weight to 1.5% by weight in the water-based ink.

15 Claims, 1 Drawing Sheet

(56) References Cited

U.S. PATENT DOCUMENTS

2007/0035588 A1* 2/2007 Umemura ................ B41J 2/175 347/65
2007/0100023 A1 5/2007 Burns et al.
2007/0100024 A1 5/2007 Gu et al.
2007/0137519 A1* 6/2007 Sugimoto ............ B41J 2/16552 106/31.13
2007/0153072 A1* 7/2007 Goto ...................... C09D 11/38 347/100
2008/0241398 A1 10/2008 Kato et al.

* cited by examiner

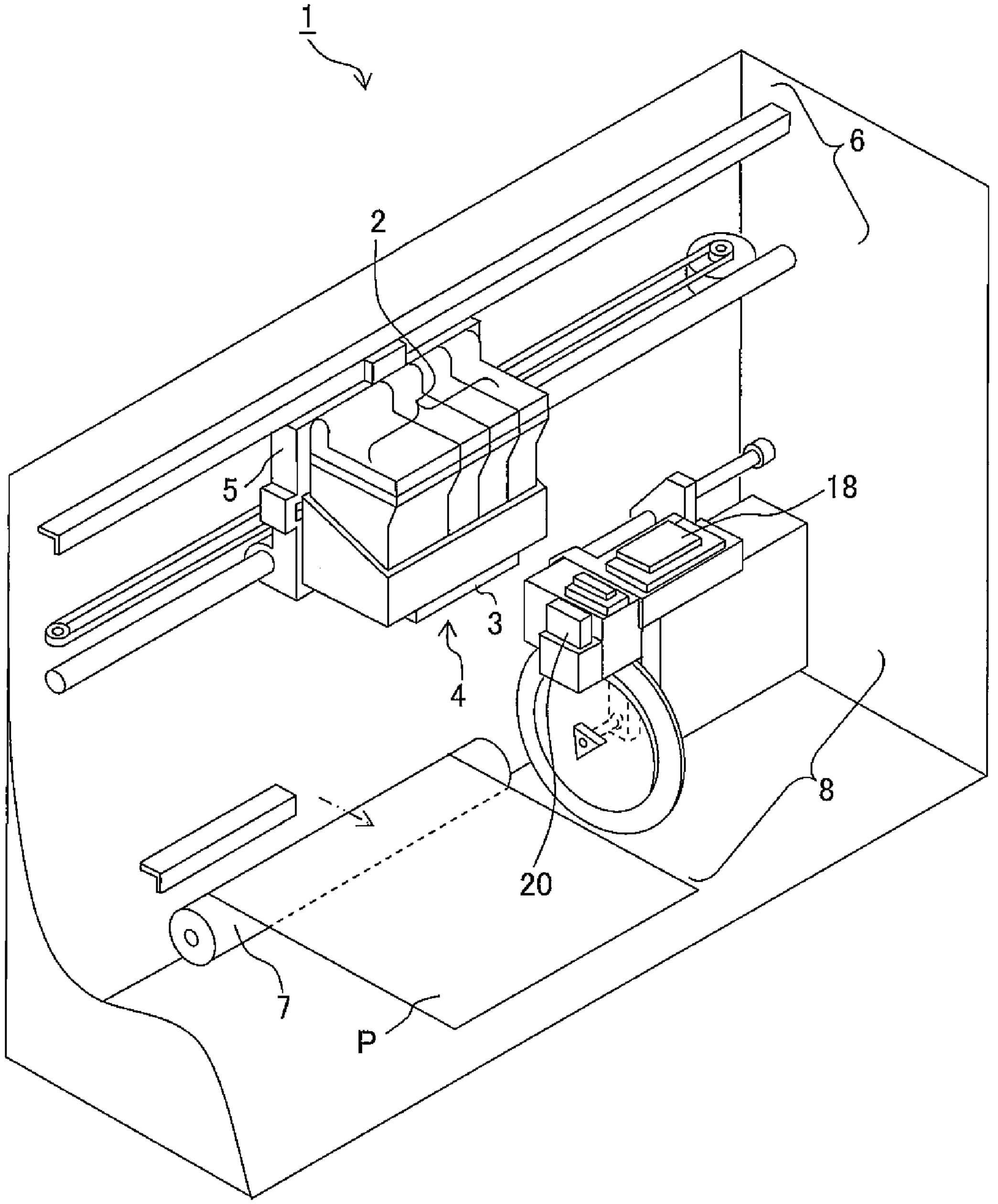
1
6
2
18
5
3
4
8
20
7
P

WATER-BASED INK FOR INK-JET RECORDING, WATER-BASED INK SET FOR INK-JET RECORDING, INK CARTRIDGE, AND INK-JET RECORDING METHOD

CROSS REFERENCE TO RELATED APPLICATION

The present application claims priority from Japanese Patent Application No. 2013-067553, filed on Mar. 27, 2013, the disclosure of which is incorporated herein by reference in its entirety.

BACKGROUND OF THE INVENTION

1. Field of the Invention

The present invention relates to a water-based ink for ink-jet recording, a water-based ink set for ink-jet recording, an ink cartridge, an ink-jet recording apparatus, and an ink-jet recording method.

2. Description of the Related Art

It is required that a water-based ink for ink-jet recording based on the use of a pigment should be adaptable to the high speed recording. A water-based black ink for ink-jet recording, for which the frequency response is improved, has been suggested as the ink adaptable to the high speed recording (Japanese Patent Application Laid-open No. 2005-248178 corresponding to United States Patent Application Publication No. 2005/0190244).

However, when the recording is performed at a low resolution in order to raise the recording speed, then a solid printing portion is not filled, and a white stripe-shaped unevenness (banding) arises on a recorded image in some cases. If the permeability of the water-based ink for ink-jet recording is enhanced in order to eliminate the white stripe-shaped unevenness (banding), the bleeding between different colors and the vaporization characteristic are deteriorated.

SUMMARY OF THE INVENTION

In view of the above, an object of the present teaching is to provide a water-based ink for ink-jet recording which does not cause any white stripe-shaped unevenness (banding) in a solid printing portion even in the case of low resolution recording, which makes it possible to suppress any bleeding between different colors, and which is excellent in the vaporization characteristic as well, even when a pigment is used.

According to a first aspect of the present teaching, there is provided a water-based ink for ink-jet recording including a pigment; water; an acetylene glycol-based surfactant contained by 0.1% by weight to 0.3% by weight in the water-based ink; tripropylene glycol methyl ether contained by 2.5% by weight to 4.5% by weight in the water-based ink; and tripropylene glycol n-butyl ether contained by 0.5% by weight to 1.5% by weight in the water-based ink.

According to a second aspect of the present teaching, there is provided a water-based ink set for ink-jet recording including a water-based black ink which is the water-based ink according to the first aspect; and a water-based yellow ink.

According to a third aspect of the present teaching, there is provided an ink cartridge including a water-based black ink which is the water-based ink according to the first aspect; a water-based yellow ink; an accommodating unit configured to accommodate the water-based black ink; and an accommodating unit configured to accommodate the water-based yellow ink.

According to a fourth aspect of the present teaching, there is provided an ink jet recording method including preparing a recording medium; and discharging the water-based ink for ink-jet recording according to the first aspect onto the recording medium in accordance with an ink-jet system.

BRIEF DESCRIPTION OF THE DRAWINGS

FIG. 1 shows a schematic perspective view illustrating an exemplary construction of an ink-jet recording apparatus according to the present teaching.

DESCRIPTION OF THE PREFERRED EMBODIMENTS

An explanation will be made about a water-based ink for ink-jet recording of the present teaching (hereinafter referred to as “water-based ink” or “ink” in some cases). The water-based ink of the present teaching contains the colorant and water.

As described above, the colorant includes the pigment. The pigment is exemplified, for example, by carbon black, inorganic pigments, and organic pigments. The carbon black is exemplified, for example, by furnace black, lamp black, acetylene black, and channel black. The inorganic pigment may be exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be any self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by means of the chemical bond directly or with any other group intervening therebetween. Those usable as the self-dispersible pigment include, for example, those in which the pigment is treated or processed in accordance with any method described, for example, in Japanese Patent Application Laid-open No. 8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. 2006/0201380), and Published Japanese Translation of PCT International Publication for Patent Application No. 2009-515007 (corresponding to United States Patent Application Publication Nos. 2007/0100023 and 2007/0100024). As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation. For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

It is preferable that the pigment is a black pigment. As described later on, the water-based black ink of the present teaching, which uses the black pigment as the pigment described above, is excellent in the bleeding performance between the black and the yellow when the water-based black ink of the present teaching is used in combination with a water-based yellow ink.

The solid content blending amount of the pigment (pigment solid content amount) with respect to the total amount of the water-based ink is not specifically limited, which can be appropriately determined, for example, on the basis of the desired optical density or the coloration or colorfulness. The pigment solid content is, for example, 0.1% by weight to 20% by weight, preferably 1% by weight to 10% by weight, and more preferably 2% by weight to 8% by weight.

The water-based ink may contain any colorant other than the pigment. The colorant other than the pigment is exemplified, for example, by dyes. Alternatively, it is also allowable that the water-based ink described above does not contain any colorant other than the pigment. The phenomenon, in which the white stripe-shaped unevenness (banding) appears on the recorded image as described above, tends to arise when the pigment is used for the colorant. Therefore, the present teaching is effective for a water-based ink which contains substantially only the pigment as the colorant, for example, a water-based ink in which 90% by weight to 100% by weight of the colorant is the pigment.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

The water-based ink described above contains a substance indicated as following (a), a substance indicated as following (b) and a substance indicated as following (c).

(a): an acetylene glycol-based surfactant (b): tripropylene glycol methyl ether (c): tripropylene glycol n-butyl ether The water-based ink described above contains the substance indicated as (a) as the surfactant. The substance indicated as (a) is not specifically limited. However, it is preferable that the substance indicated as (a) includes the compound represented by the general formula (1). In the general formula (1), m and n may be either identical with each other or different from each other. For example, m and n are numbers which satisfy m+n=0 to 50, and preferably numbers which satisfy m+n=0 to 20. $R^1$, $R^2$, $R^3$, and $R^4$ may be either identical with each other or different from each other, which are straight chain or branched chain alkyl groups each having 1 to 5 carbon atoms. The alkyl group is exemplified, for example, by methyl group, ethyl group, propyl group, isopropyl group, butyl group, and isobutyl group. The alkyl group is preferably methyl group or isobutyl group. More preferably, in the general formula (1), m and n may be either identical with each other or different from each other, m and n are numbers which satisfy m+n=4 or m+n=10, $R^1$ and $R^2$ are methyl groups, and $R^3$ and $R^4$ are isobutyl groups.

(1)

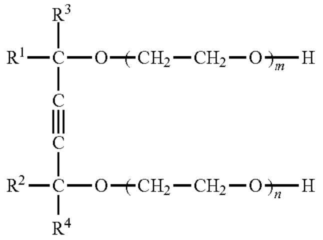

For example, any commercially available product may be used for the substance indicated as (a). The commercially available product is exemplified, for example, by "Olfin (trade name) E1004", "Olfin (trade name) E1010", "Surfynol (trade name) 440", and "Surfynol (trade name) 465" produced by Nissin Chemical Industry Co., Ltd.; and "Acetylenol (trade name) E40" and "Acetylenol (trade name) E100" produced by Kawaken Fine Chemicals Co., Ltd.

As described above, the blending amount of the substance indicated as (a) with respect to the total amount of the water-based ink is 0.1% by weight to 0.3% by weight. When the blending amount of the substance indicated as (a) is not less than 0.1% by weight, any white stripe-shaped unevenness (banding) is not caused. When the blending amount of the substance indicated as (a) is not more than 0.3% by weight, it is possible to obtain the water-based ink in which the bleeding between different colors is suppressed as well. The surfactant described above may include another surfactant other than the substance indicated as (a) within a range in which the effect of the present teaching is not deteriorated, or it is also allowable that the another surfactant is not contained.

The water-based ink described above contains, as the penetrant, the substance indicated as (b) and the substance indicated as (c). As described above, the blending amount of the substance indicated as (b) with respect to the total amount of the water-based ink is 2.5% by weight to 4.5% by weight. The blending amount of the substance indicated as (c) with respect to the total amount of the water-based ink is 0.5% by weight to 1.5% by weight. When the blending amount of the substance indicated as (b) is not less than 2.5% by weight, it is possible to obtain the water-based ink in which the bleeding between different colors is suppressed. When the blending amount of the substance indicated as (b) is not more than 4.5% by weight, it is possible to obtain the ink which is excellent in the vaporization characteristic. When the blending amount of the substance indicated as (c) is not less than 0.5% by weight, it is possible to obtain the water-based ink in which the white stripe-shaped unevenness (banding) is suppressed. The penetrant may include another penetrant other than the substance indicated as (b) and the substance indicated as (c) within a range in which the effect of the present teaching is not deteriorated. However, it is preferable that the penetrant is composed of only the substance indicated as (b) and the substance indicated as (c).

It is preferable for the water-based ink described above that the blending amount of the substance indicated as (a) with respect to the total amount of the water-based ink is 0.1% by weight to 0.2% by weight, the blending amount of the substance indicated as (b) with respect to the total amount of the water-based ink is 3.5% by weight to 4.5% by weight, and the blending amount of the substance indicated as (c) with respect to the total amount of the water-based ink is 0.5% by weight to 1.0% by weight. It is more preferable that the blending amount of the substance indicated as (a) with respect to the total amount of the water-based ink is 0.15% by weight to 0.2% by weight, the blending amount of the substance indicated as (b) with respect to the total amount of the water-based ink is 3.5% by weight to 4.0% by weight, and the blending amount of the substance indicated as (c) with respect to the total amount of the water-based ink is 0.5% by weight to 1.0% by weight.

The present inventor has found out the specified ink composition in which the effects of the respective substances are expressed in a well-balanced manner in relation to the substance indicated as (a) which is the surfactant and the substances indicated as (b) and (c) which are alkylene glycol ethers, and thus the water-based ink has been successfully realized, in which the white stripe-shaped unevenness (banding) is not caused on the recorded image, it is possible to suppress the bleeding between different colors, and the vaporization characteristic is excellent. Therefore, if any surfactant other than the substance indicated as (a) and/or any alkylene glycol ether other than the substances indicated as (b) and (c) is/are contained in the water-based ink, it is preferable that the blending amount thereof is a blending amount within such a range that the balance among the substances indicated as (a) to (c) is not collapsed. It is more preferable that the water-based ink of the present teaching does not substantially contain any surfactant other than the substance indicated as (a) and any alkylene glycol ether other than the substances indicated as (b) and (c) in the water-based ink. For example, the ratio of the substance indicated as (a) with respect to the total amount of the surfactant contained in the water-based ink is preferably 80% by weight to 100% by weight, and more preferably 90% by weight to 100% by weight. Further, the ratio of the total amount of the substance indicated as (b) and the substance indicated as (c) with respect to the total amount of alkylene glycol ether contained in the water-based ink is preferably 80% by weight to 100% by weight, and more preferably 90% by weight to 100% by weight.

In the water-based ink of present teaching, the pigment may be contained by about 6% by weight, and a weight ratio (a/p) of the acetylene glycol-based surfactant (a) to the pigment (p) may be in a range of 0.017/1 to 0.033/1; a weight ratio (b/p) of tripropylene glycol methyl ether (b) to the pigment (p) may be in a range of 0.58/1 to 0.75/1; and a weight ratio (c/p) of tripropylene glycol n-butyl ether (c) to the pigment (p) may be in a range of 0.083/1 to 0.17/1. Further, the weight ratio (a/p) of the acetylene glycol-based surfactant (a) to the pigment (p) may be in a range of 0.025/1 to 0.033/1; the weight ratio (b/p) of tripropylene glycol methyl ether (b) to the pigment (p) may be in a range of 0.58/1 to 0.6711; and the weight ratio (c/p) of tripropylene glycol n-butyl ether (c) to the pigment (p) may be in a range of 0.083/1 to 0.17/1.

The another penetrant is not specifically limited. The another penetrant is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, tetraethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol ethyl ether, and tripropylene glycol n-propyl ether. One type of the another penetrant as described above may be used singly, or two or more types of the another penetrants as described above may be used in combination.

The water-based ink described above may further contain any humectant. The humectant described above is not specifically limited. The humectant is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycols; polyhydric alcohols such as alkylene glycols, glycerol, and trimethylolpropane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

The water-based ink may further contain conventionally known additives, if necessary. The additive includes, for example, pH-adjusting agents, viscosity-adjusting agents, surface tension-adjusting agents, and fungicides. The viscosity-adjusting agent includes, for example, polyvinyl alcohol, cellulose, and water-soluble resin.

The water-based ink described above can be prepared, for example, such that the pigment, water, the substance indicated as (a), the substance indicated as (b), the substance indicated as (c), and optionally other additive components are mixed uniformly or homogeneously in accordance with any conventionally known method, and undissolved matters are removed by means of a filter or the like.

The water-based ink for ink-jet recording of the present teaching as explained above uses the predetermined amounts of the three types of the substances of (a) to (c) in combination. Therefrom, the white stripe-shaped unevenness (banding) is not caused in the solid portion even in the case of the low resolution recording, it is possible to suppress the bleeding between different colors, and the vaporization characteristic is excellent as well, although the pigment is used.

In the next viewpoint, the water-based ink set for ink-jet recording of the present teaching (hereinafter referred to as "water-based ink set" or "ink set" in some cases) resides in a water-based ink set for ink-jet recording containing a water-based black ink and a water-based yellow ink, wherein the water-based ink for ink-jet recording of the present teaching, in which the pigment is a black pigment, is included as the water-based black ink. The water-based yellow ink is not specifically limited, for which any generally available yellow ink may be used.

The colorant to be used for the water-based yellow ink may be either a pigment or a dye. Any pigment and any dye may be mixed and used as the colorant to be used for the water-based yellow ink.

Specified examples of the pigment to be used for the water-based yellow ink are exemplified, for example, by C. I. Pigment Yellows 1, 2, 3, 12, 13, 14, 15, 16, 17, 55, 78, 150, 151, 154, 180, 185, and 194. The pigment to be used for the water-based yellow ink may be any self-dispersible pigment. The self-dispersible pigment to be used for the water-based yellow ink is exemplified, for example, by "CAB-O-JET (trade name) 270Y" and "CAB-O-JET (trade name) 470Y" produced by Cabot Specialty Chemicals.

The dye to be used for the water-based yellow ink is not specifically limited. The dye to be used for the water-based yellow ink is exemplified, for example, by C. I. Direct Yellows 12, 24, 26, 86, 98 132, 142, and 173, and C. I. Acid Yellows 11, 17, 23, 25, 29, 42, 61, and 71.

The dye to be used for the water-based yellow ink is also exemplified, for example, by compounds represented by chemical formulas (Ya) to (Ye). In the chemical formulas (Ya) to (Ye), —$C_4H_9$(t) represents tert-butyl group.

(Ya)

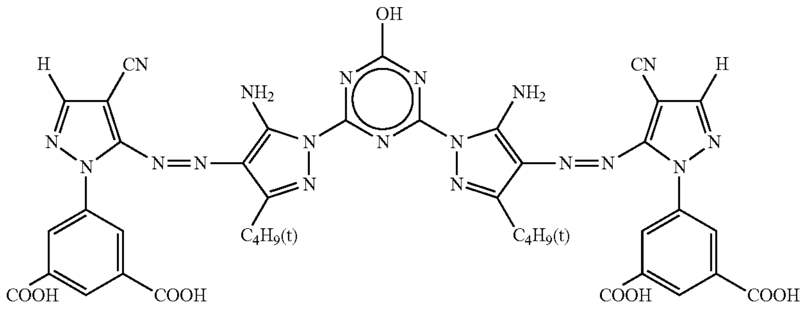

(Yb)

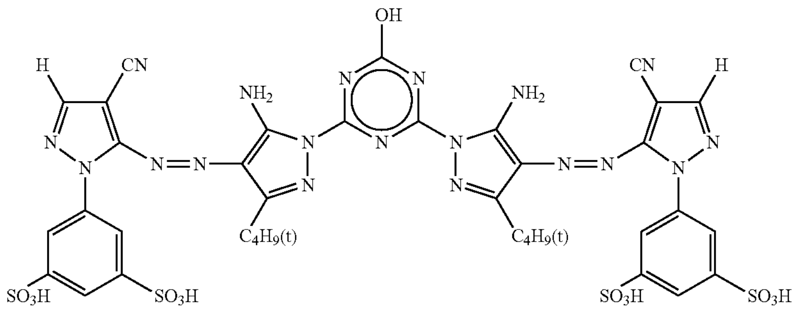

(Ye)

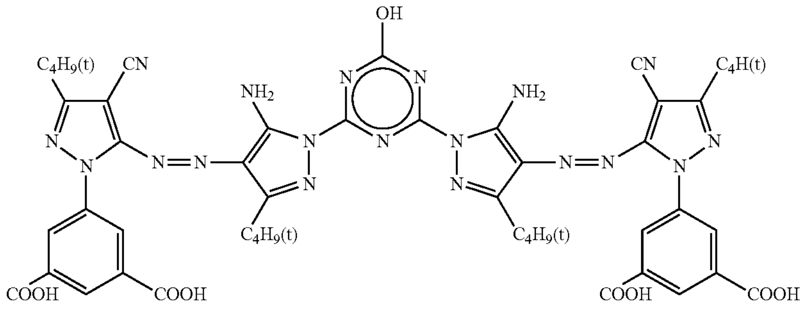

(Yd)

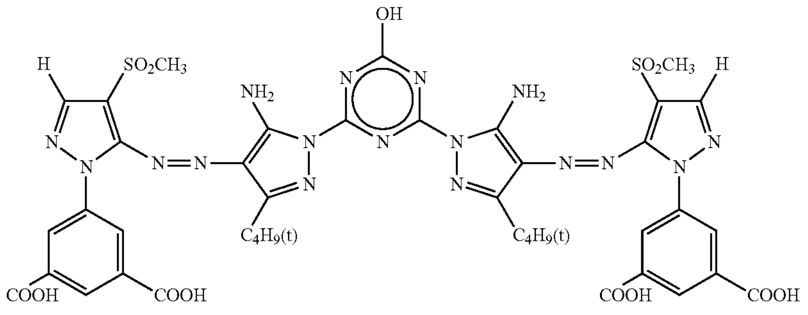

-continued (Ye)

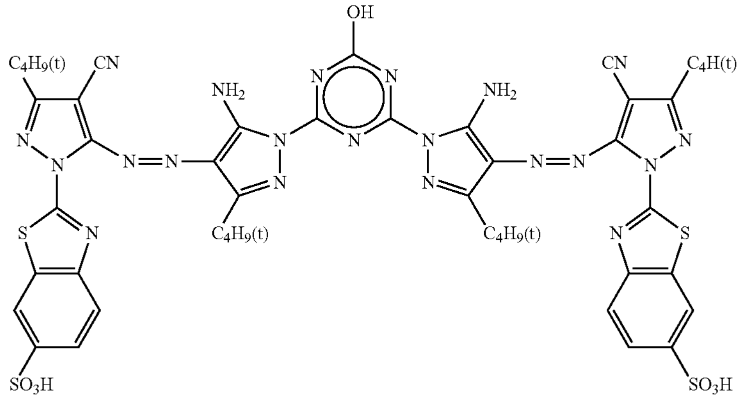

As for the water-based ink set of the present teaching, the water-based black ink is the water-based ink of the present teaching in which the three types of the substances of (a) to (c) described above are used in combination. Therefore, it is possible to suppress the bleeding between the black and the yellow, which has been difficult to be suppressed in the case of any conventional water-based ink set.

Next, an explanation will be made about the ink cartridge of the present teaching. The ink cartridge of the present teaching is an ink cartridge having accommodating units for a water-based black ink and a water-based yellow ink respectively, wherein the water-based black ink and the water-based yellow ink are water-based inks which constitute the water-based ink set for ink-jet recording of the present teaching. The ink cartridge of the present teaching may have another accommodating unit for any water-based ink other than the water-based black ink and the water-based yellow ink.

The ink cartridge of the present teaching may be an ink cartridge assembly in which an ink cartridge accommodated with the water-based black ink and an ink cartridge accommodated with the water-based yellow ink are assembled or collected. Alternatively, the ink cartridge of the present teaching may be an integrated type ink cartridge in which an interior thereof is comparted so that an accommodating unit for the water-based black ink and an accommodating unit for the water-based yellow ink are formed. For example, those conventionally known can be used for a main body of the ink cartridge of the present teaching.

Next, the ink-jet recording apparatus and the ink-jet recording method of the present teaching will be explained.

The ink-jet recording apparatus of the present teaching resides in an ink-jet recording apparatus including an ink accommodating unit and ink discharge mechanism for discharging an ink accommodated in the ink accommodating unit, wherein the water-based ink for ink-jet recording of the present teaching or the water-based ink for constructing the water-based ink set for ink-jet recording of the present teaching is accommodated in the ink accommodating unit.

The ink-jet recording method of the present teaching resides in an ink-jet recording method for performing recording by discharging a water-based ink onto a recording medium in accordance with an ink-jet system, wherein the water-based ink for ink-jet recording of the present teaching or the water-based ink for constructing the water-based ink set for ink-jet recording of the present teaching is used as the water-based ink.

The ink-jet recording method of the present teaching can be carried out, for example, by using the ink-jet recording apparatus of the present teaching. The recording includes, for example, the letter (character) printing, the image printing, and the printing (print or presswork).

FIG. 1 shows an exemplary construction of the ink-jet recording apparatus of the present teaching. As shown in FIG. 1, the ink-jet recording apparatus 1 includes, as main constitutive components, four ink cartridges 2, ink discharge mechanism (ink-jet head) 3, a head unit 4, a carriage 5, a driving unit 6, a platen roller 7, and a purge unit 8.

Each of the four ink cartridges 2 contains one color of each of four colors of water-based inks of black, yellow, magenta, and cyan. For example, the water-based black ink and the water-based yellow ink are the water-based black ink and the water-based yellow ink for constructing the water-based ink set of the present teaching. Generally available water-based inks may be used for the other water-based inks. The ink-jet head 3, which is installed for the head unit 4, performs the recording on the recording medium (for example, recording paper) P. The four ink cartridges 2 and the head unit 4 are carried on the carriage 5. The driving unit 6 reciprocatively moves the carriage 5 in the straight line direction. For example, those conventionally known can be used as the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged opposingly to the ink jet head 3.

The purge apparatus 8 sucks any defective ink containing, for example, bubbles accumulated in the ink-jet head 3. For example, those conventionally known can be used as the purge apparatus 8 (see, for example, Japanese Patent Application Laid-open No. 2008-246821).

A wiper member 20 is arranged adjacently to the purge apparatus 8 on the platen roller 7 side of the purge apparatus 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 covers a plurality of nozzles of the ink-jet head 3 which is to be returned to the reset position when the recording is completed, in order to prevent the water-based inks from being dried.

In the ink-jet recording apparatus 1 of this embodiment, the four ink cartridges 2 are carried on one carriage 5 together with the head unit 4. However, the present teaching is not limited thereto. In the ink-jet recording apparatus described above, each of the cartridges of the four ink cartridges 2 may be carried on any carriage distinct from the head unit 4. Alternatively, it is also allowable that the respective cartridges of the four ink cartridges 2 are not carried on the carriage 5, and they are arranged and fixed in the ink jet recording apparatus. In the embodiments as described above, for example, the respective cartridges of the four ink cartridges 2 are connected to the head unit 4 carried on the carriage 5, for example, by means of tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided at a side portion or a lower portion of the ink-jet recording apparatus 1. The recording paper P is introduced into the space between the ink-jet head 3 and the platen roller 7. The predetermined recording is performed on the introduced recording paper P by means of the water-based inks discharged from the ink-jet head 3. The water-based black ink of the present teaching does not lose the fluidity even when the water-based black ink of the present teaching is heated and vaporized by the ink-jet head 3. Therefore, the water-based black ink of the present teaching is excellent in the discharge stability. The recording paper P after the recording is discharged from the ink-jet recording apparatus 1. The white stripe-shaped unevenness (banding) and the bleeding between the black and the yellow are suppressed on the recorded matter subjected to the recording by using the water-based black ink and the water-based ink set of the present teaching. A paper feed mechanism and a paper discharge mechanism for the recording paper P are omitted from the illustration in FIG. 1.

The apparatus shown in FIG. 1 adopts the serial type ink-jet head. However, the present teaching is not limited thereto. The ink-jet recording apparatus may be an apparatus which adopts a line type ink jet head.

EXAMPLES

Next, Examples of the present teaching will be explained together with Comparative Examples. The present teaching is not limited to and restricted by Examples and Comparative Examples described below.

Examples 1 to 14 and Comparative Examples 1 to 15

Ink solvents were obtained by uniformly mixing components except for the pigment contained in ink compositions (Table 2 and Table 3). Subsequently, the ink solvents were added to the pigment dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based black inks for ink jet recording of Examples 1 to 14 and Comparative Examples 1 to 15 were obtained.

In relation to the water-based inks of Examples and Comparative Examples, (a) the evaluation of the banding of the solid image, (b) the evaluation of the bleeding between the black and the yellow (Bk—Y bleeding), (c) the evaluation of the vaporization characteristic, and (d) the overall evaluation were carried out in accordance with the following methods.

(a) Evaluation of Banding of Solid Image

A solid image (600 dpi×300 dpi) was recorded by using the water-based black inks of Examples and Comparative Examples on three types of papers for evaluation (Laser Print produced by Hammermill, Reytoday Copy produced by International Paper, and Business produced by Xerox) by using a digital multifunction machine DCP-J525N carried with ink-jet printer produced by Brother Industries, Ltd. The portions recorded with the solid image were visually observed, and the banding of the solid image was evaluated in accordance with the following evaluation criteria.

<Evaluation Criteria for Evaluation of Banding of Solid Image>

AA: White stripes were scarcely confirmed on any one of the papers for evaluation at the portions recorded with the solid image.

A: White stripes were slightly confirmed on any one of the papers for evaluation at the portions recorded with the solid image.

B: White stripes were clearly confirmed on any one of the papers for evaluation at the portions recorded with the solid image.

(b) Evaluation of Bk—Y Bleeding (Raggedness)

<Preparation of Water-Based Yellow Dye Ink (Y1)>

Respective components of an ink composition (Table 1) were uniformly mixed. After that, an obtained mixture was filtrated by using a hydrophilic polytetrafluoroethylene (PTFE) type membrane filter produced by Toyo Roshi Kaisha, Ltd. (pore size: 0.20 μm), and thus a water-based yellow dye ink Y1 was obtained. In Table 1, the dye (Ye) is the compound represented by the chemical formula (Yc).

<Preparation of Water-Based Yellow Pigment Ink (Y2)>

Components of an ink composition (Table 1) except for a pigment were uniformly mixed, and an ink solvent was obtained. Subsequently, the ink solvent was added to the pigment dispersed in water, followed by being uniformly mixed. After that, an obtained mixture was filtrated through a cellulose acetate type membrane filter produced by Toyo Roshi Kaisha, Ltd. (pore size: 3.00 μm), and thus a water-based yellow pigment ink Y2 was obtained.

TABLE 1

| | | Y1 | Y2 |
|---|---|---|---|
| Ink composition | Dye (Yc) | 3.00 | — |
| | CAB-O-JET (trade name) 470Y (*1) | — | 3.00 |
| | Glycerol | 30.00 | 35.50 |
| | Triethylene glycol n-butyl ether | 3.00 | — |
| | Dipropylene glycol n-propyl ether | — | 2.50 |
| | Olfin (trade name) E1010 (*2) | 0.20 | 0.20 |
| | Water | balance | balance |

(*1): Self-dispersible water-based yellow pigment, produced by Cabot Specialty Chemicals Inc., numerical value in table indicates pigment solid content;
(*2): Acetylene glycol-based surfactant, produced by Nissin Chemical Industry Co., Ltd.
Unit of ink composition: % by weight.

A solid image (600 dpi×300 dpi) was recorded by using the water-based yellow ink Y1 or Y2 on the three types of papers for evaluation described above by using the digital multifunction machine DCP-J525N carried with ink-jet printer described above. A 0.75 pt ruled line of Microsoft EXCEL (trade name) was recorded on the portion on which the solid image had been recorded, by using the water-based black inks of Examples and Comparative Examples in the same scanning. The raggedness with respect to the 0.75 pt ruled line was measured by using a handy type image evaluation system "PIAS (trade name)-II" produced by Quality Engineering Associates (QAE). The average value of measurement results of the three types of papers for evaluation was evaluated in accordance with the following evaluation criteria. The raggedness is the raggedness of the line defined by ISO13660.

The ragged line is a wavy line which is not smooth with respect to an ideal smooth line edge.

<Evaluation Criteria for Evaluation of Bk—Y Bleeding (Raggedness)>

AA: Raggedness of 0.75 pt ruled line was not more than 21 μm.

A: Raggedness of 0.75 pt ruled line was larger than 21 μm and not more than 24 μm.

B: Raggedness of 0.75 pt ruled line was larger than 24 μm and not more than 27 μm.

C: Raggedness of 0.75 pt ruled line was larger than 27 μm.

(c) Evaluation of Vaporization Characteristic 5 g of each of the water-based black inks of Examples and Comparative Examples was poured into an open bottle (bore diameter: 20.2 mm). The open bottles were stored for 5 days in a thermostatic chamber at a temperature of 60° C. and a relative humidity of 40%. After the storage, the state of the water-based black ink in the open bottle was visually observed, which was evaluated in accordance with the following evaluation criteria.

<Evaluation Criteria for Evaluation of Vaporization Characteristic>

AA: Ink had fluidity.

A: Ink was thixotropic (fluidity was exhibited when force (impact) was applied).

C: Ink was solidified.

(d) Overall Evaluation

Overall evaluation was carried out in accordance with the following evaluation criteria from the results of (a) to (c) described above for the respective water-based black inks, <Evaluation Criteria for Overall Evaluation>

G: All evaluation results were not less than A.

NG: Any one of those not more than B was present in any one of evaluation results.

Ink compositions and evaluation results are shown in Table 2 for the water-based black inks of Examples. Further, ink compositions and evaluation results are shown in Table 3 for the water-based black inks of Comparative Examples.

TABLE 2

| | | Example | | | | | |
|---|---|---|---|---|---|---|---|
| | | 1 | 2 | 3 | 4 | 5 | |
| Ink composition | CAB-O-JET (trade name) 300 (*3) | 6.00 | 6.00 | 6.00 | 6.00 | 6.00 | |
| | CAB-O-JET (trade name) 400 (*4) | — | — | — | — | — | |
| | (a) Olfin (trade name) E1010 (*2) | 0.10 | 0.30 | 0.10 | 0.30 | 0.10 | |
| | Olfin (trade name) E1004 (*5) | — | — | — | — | — | |
| | (b) Tripropylene glycol methyl ether | 2.50 | 2.50 | 2.50 | 2.50 | 4.50 | |
| | (c) Tripropylene glycol n-butyl ether | 0.50 | 0.50 | 1.50 | 1.50 | 0.50 | |
| | Glycerol | 21.70 | 21.50 | 20.60 | 20.40 | 19.70 | |
| | Water | balance | balance | balance | balance | balance | |
| Yellow ink | | Y1 | Y1 | Y1 | Y1 | Y1 | Y2 |
| Banding of solid image | | A | A | AA | AA | A | A |
| Bk-Y bleeding (raggedness) | | AA | A | A | A | AA | AA |
| Vaporization characteristic | | A | A | A | A | A | A |
| Overall evaluation | | G | G | G | G | G | G |

| | | Example | | | | | |
|---|---|---|---|---|---|---|---|
| | | 6 | 7 | 8 | | 9 | |
| Ink composition | CAB-O-JET (trade name) 300 (*3) | 6.00 | 6.00 | 6.00 | | 6.00 | |
| | CAB-O-JET (trade name) 400 (*4) | — | — | — | | — | |
| | (a) Olfin (trade name) E1010 (*2) | 0.30 | 0.10 | 0.30 | | 0.20 | |
| | Olfin (trade name) E1004 (*5) | — | — | — | | — | |
| | (b) Tripropylene glycol methyl ether | 4.50 | 4.50 | 4.50 | | 3.5 | |
| | (c) Tripropylene glycol n-butyl ether | 0.50 | 1.50 | 1.50 | | 1.00 | |
| | Glycerol | 19.50 | 18.50 | 16.10 | | 18.90 | |
| | Water | balance | balance | balance | | balance | |
| Yellow ink | | Y1 | Y1 | Y1 | Y2 | Y1 | Y2 |
| Banding of solid image | | A | AA | AA | AA | AA | AA |
| Bk-Y bleeding (raggedness) | | AA | A | A | A | AA | AA |
| Vaporization characteristic | | A | A | A | A | A | A |
| Overall evaluation | | G | G | G | G | G | G |

| | | Example | | | | |
|---|---|---|---|---|---|---|
| | | 10 | 11 | 12 | 13 | 14 |
| Ink composition | CAB-O-JET (trade name) 300 (*3) | 6.00 | 6.00 | — | — | — |
| | CAB-O-JET (trade name) 400 (*4) | — | — | 6.00 | 6.00 | 6.00 |
| | (a) Olfin (trade name) B1010 (*2) | — | — | 0.10 | 0.30 | 0.20 |
| | Olfin (trade name) E1004 (*5) | 0.10 | 0.20 | — | — | — |
| | (b) Tripropylene glycol methyl ether | 4.50 | 4.50 | 4.50 | 4.50 | 3.50 |
| | (c) Tripropylene glycol n-butyl ether | 0.50 | 1.00 | 0.50 | 1.50 | 1.00 |
| | Glycerol | 18.00 | 17.50 | 19.50 | 18.30 | 20.00 |
| | Water | balance | balance | balance | balance | balance |
| Yellow ink | | Y1 | Y1 | Y1 | Y1 | Y1 |
| Banding of solid image | | A | AA | A | AA | AA |
| Bk-Y bleeding (raggedness) | | AA | A | AA | A | AA |

TABLE 2-continued

| | | | | | |
|---|---|---|---|---|---|
| Vaporization characteristic | A | A | A | A | A |
| Overall evaluation | G | G | G | G | G |

(*3): Self-dispersible carbon black, produced by Cabot Specialty Chemicals Inc., numerical values in table indicate pigment solid contents;
(*4): Self-dispersible carbon black, produced by Cabot Specialty Chemicals Inc., numerical values in table indicate pigment solid contents;
(*2): Acetylene glycol-based surfactant represented by general formula (1), in general formula (1), m + n = 10 is given, $R^1$ and $R^2$ are methyl groups, and $R^3$ and $R^4$ are isobutyl groups, produced by Nissin Chemical Industry Co., Ltd.;
(*5): Acetylene glycol-based surfactant represented by general formula (1), in general formula (1), m + n = 4 is given, $R^1$ and $R^2$ are methyl groups, and $R^3$ and $R^4$ are isobutyl groups, produced by Nissin Chemical Industry Co., Ltd.
Unit of ink composition: % by weight.

TABLE 3

| | | Comparative Example | | | | | |
|---|---|---|---|---|---|---|---|
| | | 1 | 2 | 3 | 4 | | 5 |
| Ink composition (% by weight) | CAB-O-JET (trade name) 300 (*3) | 6.00 | 6.00 | 6.00 | 6.00 | | 6.00 |
| | CAB-O-JET (trade name) 400 (*4) | — | — | — | — | | — |
| | (a) Olfin (trade name) E1010 (*2) | 0.30 | 0.30 | — | 0.10 | | 0.20 |
| | (b) Tripropylene glycol methyl ether | — | 4.50 | 4.50 | 4.50 | | 3.50 |
| | (c) Tripropylene glycol n-butyl ether | 1.50 | — | 1.50 | 0.20 | | 2.00 |
| | Triethylene glycol n-butyl ether | — | — | — | — | | — |
| | Dipropylene glycol n-propyl ether | — | — | — | — | | — |
| | Nonioside (trade name) B-15 (*6) | — | — | — | — | | — |
| | Glycerol | 21.00 | 18.50 | 17.00 | 18.60 | | 17.50 |
| | Water | balance | balance | balance | balance | | balance |
| Yellow ink | | Y1 | Y1 | Y1 | Y1 | Y2 | Y1 |
| Banding of solid image | | A | B | B | B | B | AA |
| Bk-Y bleeding (raggedness) | | C | AA | AA | A | A | C |
| Vaporization characteristic | | A | A | A | A | A | B |
| Overall evaluation | | NG | NG | NG | NG | NG | NG |

| | | Comparative Example | | | | | |
|---|---|---|---|---|---|---|---|
| | | 6 | 7 | | 8 | | 9 |
| Ink composition (% by weight) | CAB-O-JET (trade name) 300 (*3) | 6.00 | 6.00 | | 6.00 | | 6.00 |
| | CAB-O-JET (trade name) 400 (*4) | — | — | | — | | — |
| | (a) Olfin (trade name) E1010 (*2) | 0.20 | 0.30 | | 0.60 | | 0.20 |
| | (b) Tripropylene glycol methyl ether | 2.00 | 5.00 | | 3.50 | | 3.50 |
| | (c) Tripropylene glycol n-butyl ether | 1.50 | 1.50 | | 1.00 | | — |
| | Triethylene glycol n-butyl ether | — | — | | — | | — |
| | Dipropylene glycol n-propyl ether | — | — | | — | | 1.00 |
| | Nonioside (trade name) B-15 (*6) | — | — | | — | | — |
| | Glycerol | 18.00 | 15.00 | | 16.00 | | 20.50 |
| | Water | balance | balance | | balance | | balance |
| Yellow ink | | Y1 | Y1 | Y2 | Y1 | Y2 | Y1 |
| Banding of solid image | | AA | A | A | A | A | B |
| Bk-Y bleeding (raggedness) | | C | AA | AA | C | C | AA |
| Vaporization characteristic | | A | B | B | A | A | A |
| Overall evaluation | | NG | NG | NG | NG | NG | NG |

| | | Comparative Example | | | | | |
|---|---|---|---|---|---|---|---|
| | | 10 | 11 | 12 | 13 | 14 | 15 |
| Ink composition (% by weight) | CAB-O-JET (trade name) 300 (*3) | 6.00 | 6.00 | 6.00 | | — | — |
| | CAB-O-JET (trade name) 400 (*4) | — | — | — | 6.00 | 6.00 | 6.00 |
| | (a) Olfin (trade name) E1010 (*2) | 0.20 | 0.20 | — | 0.10 | 0.60 | 0.20 |
| | (b) Tripropylene glycol methyl ether | — | 3.50 | 3.50 | 4.50 | 3.50 | 3.50 |
| | (c) Tripropylene glycol n-butyl ether | 1.00 | — | 1.00 | 0.20 | 1.00 | — |
| | Triethylene glycol n-butyl ether | — | 1.00 | — | — | — | 1.00 |
| | Dipropylene glycol n-propyl ether | 3.50 | — | — | — | — | — |
| | Nonioside (trade name) B-15 (*6) | — | — | 0.20 | — | — | — |
| | Glycerol | 17.00 | 16.80 | 18.20 | 18.50 | 15.80 | 16.60 |
| | Water | balance | balance | balance | balance | balance | balance |
| Yellow ink | | Y1 | Y1 | Y1 | Y1 | Y1 | Y1 |
| Banding of solid image | | A | B | B | B | A | B |
| Bk-Y bleeding (raggedness) | | B | AA | B | A | C | AA |
| Vaporization characteristic | | A | A | A | A | A | A |
| Overall evaluation | | NG | NG | NG | NG | NG | NG |

(*3): Self-dispersible carbon black, produced by Cabot Specialty Chemicals Inc., numerical values in table indicate pigment solid contents;
(*4): Self-dispersible carbon black, produced by Cabot Specialty Chemicals Inc., numerical values in table indicate pigment solid contents;
(*2): Acetylene glycol-based surfactant represented by general formula (1), in general formula (1), m + n = 10 is given, $R^1$ and $R^2$ are methyl groups, and $R^3$ and $R^4$ are isobutyl groups, produced by Nissin Chemical Industry Co., Ltd.;
(*6): Alkyl polyglucoside having number of carbon atoms of 4, produced by Dai-ichi Kogyo Seiyaku Co., Ltd.

As shown in Table 2, Examples 1 to 14 were excellent in all of the results of the evaluation of the banding of the solid image, the evaluation of the Bk—Y bleeding (raggedness), and the evaluation of the vaporization characteristic.

On the other hand, as shown in Table 3, the results of the evaluation of the Bk—Y bleeding (raggedness) were extremely unsatisfactory in relation to Comparative Example 1 in which the substance indicated as (b) was not used, Comparative Example 6 in which the blending amount of the substance indicated as (b) was 2.00% by weight, and Comparative Examples 8 and 14 in which the blending amount of the substance indicated as (a) was 0.60% by weight. The result of the evaluation of the Bk—Y bleeding (raggedness) was unsatisfactory in relation to Comparative Example 10 in which dipropylene glycol n-propyl ether was used in place of the substance indicated as (b).

The results of the evaluation of the banding of the solid image were unsatisfactory in relation to Comparative Example 2 in which the substance indicated as (c) was not used, Comparative Example 3 in which the substance indicated as (a) was not used, Comparative Example 4 in which the blending amount of the substance indicated as (c) was 0.20% by weight, Comparative Examples 9, 11, and 15 in which dipropylene glycol n-propyl ether or triethylene glycol n-butyl ether was used in place of the substance indicated as (c), and Comparative Example 13 in which the blending amount of the substance indicated as (c) was 0.20% by weight.

The result of the evaluation of the Bk—Y bleeding (raggedness) was extremely unsatisfactory and the result of the evaluation of the vaporization characteristic was unsatisfactory in relation to Comparative Example 5 in which the blending amount of the substance indicated as (c) was 2.00% by weight.

Further, the result of the evaluation of the vaporization characteristic was unsatisfactory in relation to Comparative Example 7 in which the blending amount of the substance indicated as (b) was 5.00% by weight.

Further, the results of the evaluation of the banding of the solid image and the evaluation of the Bk—Y bleeding (raggedness) were unsatisfactory in relation to Comparative Example 12 in which alkyl polyglucoside having a number of carbon atoms of 4 was used in place of the substance indicated as (a).

As described above, in the case of the water-based ink of the present teaching, even when the pigment is used, then the white stripe-shaped unevenness (banding) does not arise in the solid printing portion even if the low resolution recording is performed, the bleeding between different colors can be also suppressed, and the vaporization characteristic is excellent as well. The way of use of the water-based ink of the present teaching is not specifically limited. The water-based ink of the present teaching can be widely applied to various types of the ink-jet recording.

What is claimed is:

1. A water-based ink for ink-jet recording comprising:

a pigment;

water;

an acetylene glycol-based surfactant contained by 0.1% by weight to 0.2% by weight in the water-based ink;

tripropylene glycol methyl ether contained by 3.5% by weight to 4.5% by weight in the water-based ink; and tripropylene glycol n-butyl ether contained by 0.5% by weight to 1.0% by weight in the water-based ink, wherein:

a weight ratio (a/p) of the acetylene glycol-based surfactant (a) to the pigment (p) is in a range of 0.017/1 to 0.033/1;

a weight ratio (b/p) of tripropylene glycol methyl ether (b) to the pigment (p) is in a range of 0.58/1 to 0.75/1; and a weight ratio (c/p) of tripropylene glycol n-butyl ether (c) to the pigment (p) is in a range of 0.083/1 to 0.17/1.

2. The water-based ink for ink-jet recording according to claim 1, wherein:

the acetylene glycol-based surfactant is contained by 0.15% by weight to 0.2% by weight in the water-based ink;

tripropylene glycol methyl ether is contained by 3.5% by weight to 4.0% by weight in the water-based ink; and tripropylene glycol n-butyl ether is contained by 0.5% by weight to 1.0% by weight in the water-based ink.

3. The water-based ink for ink-jet recording according to claim 2, wherein a weight ratio (a/p) of the acetylene glycol-based surfactant (a) to the pigment (p) is in a range of 0.025/1 to 0.033/1; a weight ratio (b/p) of tripropylene glycol methyl ether (b) to the pigment (p) is in a range of 0.58/1 to 0.67/1; and a weight ratio (c/p) of tripropylene glycol n-butyl ether (c) to the pigment (p) is in a range of 0.083/1 to 0.17/1.

4. The water-based ink for ink-jet recording according to claim 1, wherein the acetylene glycol-based surfactant is a compound represented by a general formula (1):

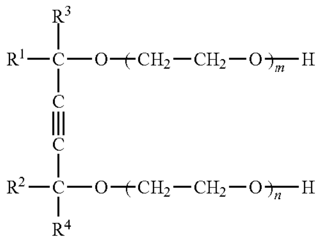

(1)

wherein in the general formula (1), m and n are identical with each other or different from each other, and satisfy m +n =0to 50;

$R^1$, $R^2$, $R^3$, and $R^4$ are identical with each other or different from each other, and are straight chain or branched chain alkyl groups each having 1 to 5 carbon atoms.

5. The water-based ink for ink-jet recording according to claim 4, wherein the acetylene glycol-based surfactant is the compound represented by the general formula (1), in which m and n are identical with each other or different from each other, and satisfy m +n =4 or m +n =10; $R^1$ and $R^2$ are methyl groups, and $R^3$ and $R^4$ are isobutyl groups.

6. The water-based ink for ink-jet recording according to claim 1, wherein the pigment is a black pigment.

7. The water-based ink for ink-jet recording according to claim 1, wherein the water-based ink does not contain any colorant other than the pigment.

8. The water-based ink for ink-jet recording according to claim 1, wherein the water-based ink does not contain any surfactant other than the acetylene glycol-based surfactant.

9. The water-based ink for ink-jet recording according to claim 1, wherein the water-based ink does not contain any alkylene glycol ether other than tripropylene glycol methyl ether and tripropylene glycol n-butyl ether.

10. The water-based ink for ink-jet recording according to claim 1, wherein the pigment is contained by 6% by weight in the water-based ink.

11. A water-based ink set for ink-jet recording comprising:
a water-based black ink which is the water-based ink as defined in claim 6; and
a water-based yellow ink.

12. An ink cartridge comprising:
a water-based black ink which is the water-based ink as defined in claim 6;
a water-based yellow ink;
an accommodating unit configured to accommodate the water-based black ink; and
an accommodating unit configured to accommodate the water-based yellow ink.

13. An ink cartridge comprising:
the water-based ink for ink-jet recording as defined in claim 1; and
an accommodating unit configured to accommodate the water-based ink.

14. An ink-jet recording method comprising:
preparing a recording medium; and
discharging the water-based ink for ink-jet recording as defined in claim 1 onto the recording medium in accordance with an ink-jet system.

15. An ink-jet recording method comprising:
preparing a recording medium; and
discharging a water-based ink which constitutes the water-based ink set for ink-jet recording as defined in claim 11 onto the recording medium in accordance with an ink-jet system.

* * * * *